United States Patent [19]

Klatt et al.

[11] 4,005,911
[45] Feb. 1, 1977

[54] INDIVIDUAL WHEEL ANTISKID BRAKE CONTROL SYSTEM ARRANGED TO PREVENT EXCESSIVE BRAKE PRESSURE DIFFERENCES

[75] Inventors: Alfred Klatt, Wathlingen; Klaus Lindemann; Dieter Luhdorff, both of Hannover; Erich Reinecke, Beinhorn, all of Germany

[73] Assignee: WABCO Westinghouse GmbH, Hannover, Germany

[22] Filed: Oct. 6, 1975

[21] Appl. No.: 619,693

[52] U.S. Cl. .............................. 303/111; 303/103
[51] Int. Cl.² ...................... B60T 8/02; B60T 8/26
[58] Field of Search ......... 303/21 EB, 21 BE, 21 P, 303/96, 106, 103, 111

[56] References Cited
UNITED STATES PATENTS

| | | | |
|---|---|---|---|
| 3,840,278 | 10/1974 | Fleischer | 303/21 EB |
| 3,866,981 | 2/1975 | Klatt | 303/21 P SA |
| 3,918,766 | 11/1975 | Klatt | 303/21 P SA |
| 3,926,477 | 12/1975 | Klatt | 303/21 P SA |

*Primary Examiner*—George E. A. Halvosa
*Assistant Examiner*—Reinhard J. Eisenzopf
*Attorney, Agent, or Firm*—R. W. McIntire, Jr.

[57] ABSTRACT

An antiskid brake control system for an automotive vehicle of the type having for each wheel signalling apparatus to scan and sense its dynamic behavior characteristics during braking and electronic evaluation circuitry whose output signals operate electropneumatic modulator valves to override the operator controlled fluid brake pressure at a respective wheel when the signalling apparatus indicates an impending wheel skid. The invention features a pulse generator for each wheel of a pair of wheels that is cross-connected with the evaluation circuitry of the opposite wheel so as to effect intermittent operation of one wheel modulator valve only when the evaluation circuit of the other wheel indicates an impending wheel skid in the absence of an impending wheel skid condition of the one wheel. The intermittent operation of the one wheel modulator valve effects brake pressure buildup at a slower than normal rate to prevent excessive brake pressure differences from arising sufficient to cause directional instability when the pair of wheels are the vehicle steering wheels. The invention has the advantage of assuring brake pressure buildup at the one wheel, even in the event the indication of an impending wheel skid by the evaluation circuit is due to a malfunction.

3 Claims, 1 Drawing Figure

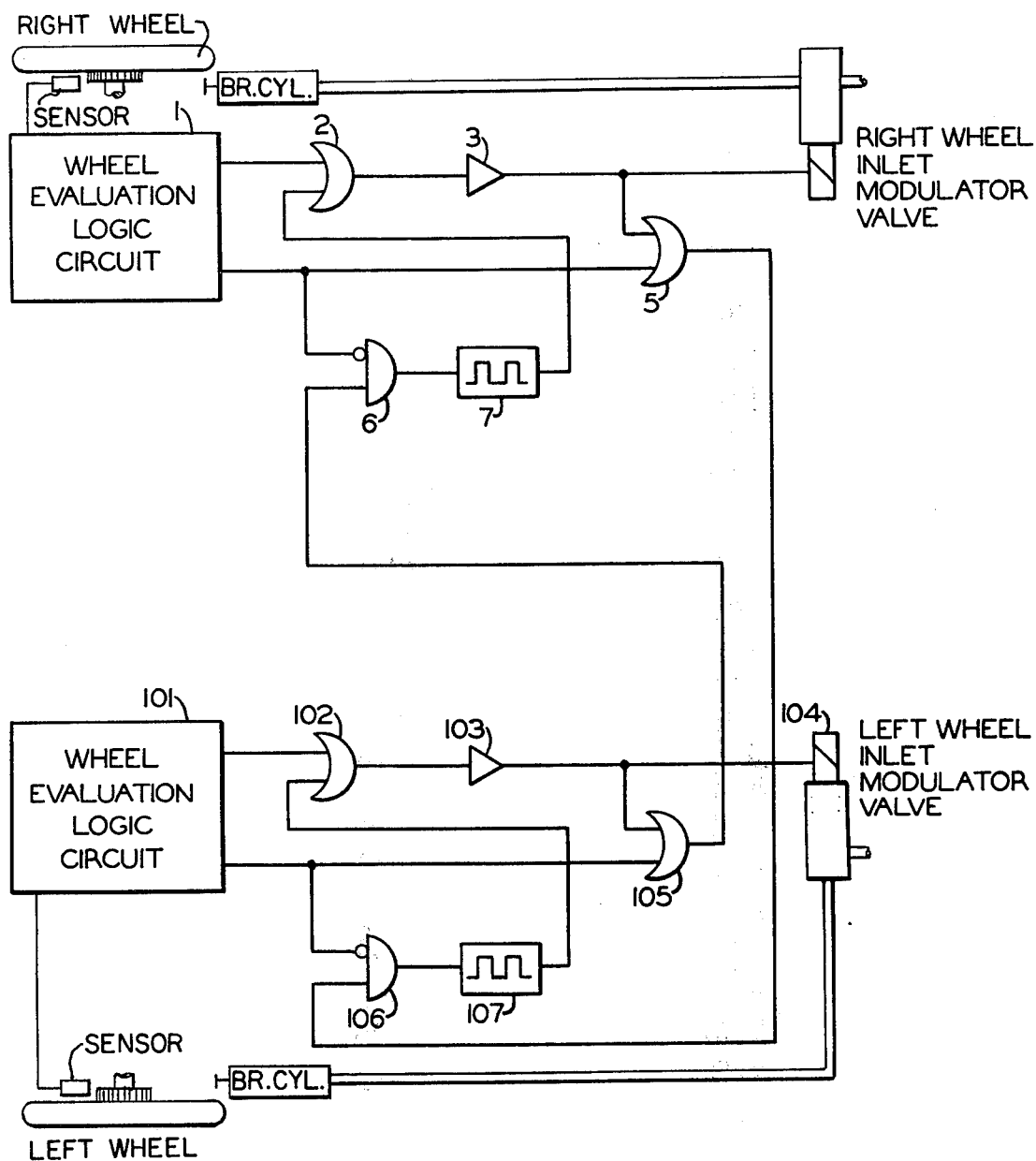

INDIVIDUAL WHEEL ANTISKID BRAKE CONTROL SYSTEM ARRANGED TO PREVENT EXCESSIVE BRAKE PRESSURE DIFFERENCES

BACKGROUND OF THE INVENTION

The present invention is concerned with an electronic antiskid brake control system particularly for an automotive type vehicle, wherein each wheel of the vehicle includes signal generating means to monitor the dynamic behavior of the wheel and an evaluation logic circuit which responds to the wheel behavior signals to provide adaptive brake control on an individual wheel basis.

A previously disclosed system of the above type, as shown and described in U.S. Pat. No. 3,918,766, is further arranged so that the brake pressure of a normally rotating wheel is held constant under the influence of the wheel evaluation circuit of a wheel detected as exhibiting a skidding tendency. This holding constant of the normally rotating wheel brake pressure is accomplished by cutting off the supply of operator controlled fluid brake pressure to that wheel brake unit at the onset of a skidding tendency by the other wheel, the wheels under discussion being the vehicle steering wheels. The purpose in cutting off further buildup of brake pressure at a normally rotating one of the vehicle steering wheels at the time the other wheel brake pressure is exhausted in response to operation of the adaptive brake control system thereof to counteract a skid tendency is to limit the brake pressure difference between the respective wheels. This is desirable from the standpoint of alleviating severe steering instability and vehicle yaw, which occur due to unequal brake forces producing a side pull on the vehicle. It will be appreciated, of course, that the purpose for allowing a normally rotating wheel brake pressure to develop in the first place is to obtain more efficient braking performance, since the normally rotating wheel does have the ability to produce maximum retardation, as opposed to a skidding wheel's ability to produce only minimum retardation. Thus, to allow both wheel brake pressures to be exhausted by the adaptive brake control when only one wheel skids or shows a tendency toward wheel skid would constitute a loss in potential brake effort and retardation. On the other hand, allowing each wheel brake pressure to be governed according to its own dynamic behavior, could result in extreme differences in wheel brake pressure when only one wheel encounters a skid condition.

While the above discussed system normally operates satisfactorily in performing the desired adaptive brake control functions to prevent substantial wheel brake force differences from developing, there is the possibility that a false signal could arise within the electronic circuitry to inadvertently preclude the attainment of brake pressure development at one or both wheels, such as to extend the vehicle stopping distance. For example, should a circuit or component malfunction produce a false signal indicative of one wheel displaying a skidding tendency prior to a brake application being made, the adaptive brake control system of the other wheel will respond to the false signal by operating the inlet modulator valve thereof to a cut-off position. In the absence of some means of recognizing a false signal, operator controlled brake pressure applied in response to a subsequent brake application will be interrupted by the modulator valve. In addition, the modulator valve associated with the adaptive brake control system of the wheel from which the false signal is arising is also operated to also cut off any supply of brake pressure to that wheel so that neither of the wheels produce any brake effort, while in fact both wheels may be rotating normally and therefore have the ability to provide maximum brake effort and retardation.

SUMMARY OF THE INVENTION

It is the object of the invention, therefore, to provide an electronic antiskid wheel brake control system that is arranged so that the brake pressure of a non-skidding wheel is influenced by the evaluation logic circuit of a skidding wheel in order to establish a controlled buildup of fluid brake pressure, which avoids large differences between the respective wheel brake pressures, yet assures development of brake pressure at the non-skidding wheel even when a false signal exists.

In accomplishing this objective, the present invention combines with the evaluation circuit of each wheel a pulse generator device for controlling the solenoid of an inlet modulator valve in an intermittent manner. The pulse generator of each wheel is connected so as to be activated only in response to one or more output signals from the evaluation circuit or from the input signal to the modulator valve solenoid of the other wheel in the absence of a wheel skid condition of the one wheel. The pulse generator of each wheel is by-passed by one or more output signals of its own evaluation logic, which controls the inlet modulator valve of the corresponding wheel directly. The pulse generator control of the inlet modulator valve of the opposite wheel is intermittent so that a slower buildup of brake pressure is realized, such buildup, however, being assured, while still avoiding a large brake pressure difference between a skidding and non-skidding wheel. The fact that the influence of the skidding wheel evaluation logic on a normally rotating wheel is accomplished without actually cutting off the supply of operator controlled brake pressure, as in previous arrangements, assures that even if a signal malfunction occurs either during or prior to an adaptive brake control operation, brake pressure will be able to develop at the non-skidding wheel.

Other objects and advantages of the invention will appear from the following more detailed description when taken in accordance with the accompanying single FIGURE drawing.

DESCRIPTION AND OPERATION

The single FIGURE drawing shows the logic and interconnections between the pulse generators and evaluation circuits of a pair of wheels preferably the wheels located on opposite sides of a vehicle, such as the steering wheels, for example.

For the sake of clarity and simplification, any known devices including circuits and conductors associated therewith, which need not be shown for an understanding of the invention, have either been omitted or shown only in block form.

Associated with the right steering wheel is a wheel evaluation logic circuit represented by block 1. The logic circuit of block 1 is so arranged as to provide output signals according to input signals representing specific dynamic conditions of the right wheel as monitored by wheel sensing means, such as positive and negative acceleration threshold detectors and velocity threshold detectors. It is well known in the art of adaptive brake control to continuously monitor dynamic wheel conditions and to arrange the circuitry of logic block 1 to evaluate these dynamic wheel conditions in order to enforce such adaptive brake control measures as necessary to obtain optimum braking under adverse conditions of wheel/road adhesion.

Also associated with the right steering wheel and accordingly with the logic circuit of block 1 is modulator valve means including a solenoid operated inlet valve 4 via which operator controlled fluid pressure is normally conducted to the wheel brake unit. The modulator valve means normally includes an additional solenoid operated valve for exhausting fluid pressure from the wheel brake unit, which is not shown as it is deemed unnecessary for an understanding of the present invention.

In order to preserve a fail-safe brake system, inlet valve 4 is open in the deenergized condition of its solenoid and is closed when the solenoid is energized.

For the purpose of the present invention, only two output signals are shown at the logic circuit of block 1, although additional output signals may be provided to achieve functions unrelated to the present invention.

From block 1, one output signal is connected directly to one input of an OR gate 2, whose output signal is connected to the solenoid of inlet valve 4 via a suitable signal amplifier 3, and to one input of an OR gate 5. The other output signal of logic block 1 is connected to the other input of OR gate 5 and to a signal inverting input of an AND gate 6, whose output is connected to a pulse generator device 7 of conventional, well-known construction. The output of pulse generator device 7 is connected to the other input of OR gate 2.

Associated with the left steering wheel is an identical arrangement as described above, with corresponding items being identified by reference numerals increased by a value of one hundred.

These adaptive brake control systems of the individual right and left steering wheels are interconnected by reason of the output of OR gate 5 being connected with an input of AND gate 106 and the output of OR gate 105 being connected with an input of AND gate 6.

In operation, let it be assumed that the right steering wheel of the vehicle is exposed to a road surface having a lower coefficient of friction characteristic than the left steering wheel, so that in response to a brake application on the part of the vehicle operator, the right wheel exhibits a wheel skid tendency sooner than the left wheel. As herein used, a wheel skid refers to the condition of a wheel when it is locked against rotation due, for example, to excessive braking torque relative to the wheel torque imparted by the roadway being traversed by the vehicle. Also, a tendency toward wheel skid or impending wheel skid refers to the condition of the wheel when rotating at a speed less than synchronous speed prior to wheel lock or skid.

Now, when the right wheel deceleration exceeds a predetermined deceleration threshold upon exhibiting a tendency toward wheel skid, logic block 1 emits a control signal at its output connected to OR gate 2. It should be understood that this control signal is the result of logic block 1 evaluating wheel condition signals received from the wheel sensing means. This output signal is transmitted via amplifier 3 to the solenoid operated inlet valve 4, which is energized to interrupt further supply of operator controlled fluid brake pressure to the brake unit of the right wheel. Although not shown, the right wheel exhaust valve may be concurrently energized to dump fluid brake pressure from the brake unit and accordingly relieve brake force from the right wheel sufficient to correct the impending wheel skid.

At the same time, logic block 1 emits another control signal at a different output, which disables AND gate 6 and is fed to OR gate 5 together with the amplified input signal to the solenoid of inlet valve 4. OR gate 5 consequently emits an output signal to AND gate 106. Since the left wheel is assumed to be rotating with synchronous speed and therefore does not exhibit a skidding tendency, there is no signal emitted at either output of logic block 101. Consequently, there is no signal fed to the inverted input of AND gate 106, which is accordingly enabled to provide an output at the instant the signal is received from OR gate 5. Pulse generator 107 is activated by the output from AND gate 106 to continuously generate constant time base pulse signals. These signals act through OR gate 102 and amplifier 103 to intermittently energize and deenergize the solenoid of inlet valve 104 and thereby repeatedly open and close the inlet valve to the supply of operator controlled fluid brake pressure. This results in a slow yet steady buildup of fluid brake pressure at the left wheel brake unit concurrently with the termination (and dumping) of fluid brake pressure at the right wheel brake unit. It will be appreciated therefore that a large difference between the right and left wheel brake forces is prevented from arising during the period the impending skid condition of the right wheel is being corrected, so that severe steering instability is prevented from occurring without excessive loss of stopping ability.

At this point, it should be understood that in the event the wheel skid condition of the right wheel persists, the pulse generator 107 will continue to be excited and the slow buildup of fluid brake pressure at the left wheel brake unit will continue until this wheel also exhibits a wheel skid tendency. When this occurs, the inverted input of AND gate 106 receives a signal from the one output of logic block 101 to disable AND gate 106 and thereby terminate operation of pulse generator 107 and consequently the intermittent or pulsed control of inlet valve 104. Since logic block 101 concurrently emits another output signal to OR gate 102, this signal is amplified and passed to the solenoid of inlet valve 104, which assumes its closed position to cut-off the supply of operator controlled fluid brake pressure, so that the left wheel is now subject to brake control as influenced by logic block 101 in accordance with the dynamic condition of the left wheel.

By interconnecting the respective left and right wheel brake control systems, as above explained, these systems function so that the non-skidding wheel is influenced by the wheel showing a skid tendency to the extent that its brake pressure is developed in a controlled manner. It will be appreciated therefore that this controlled brake pressure development is achieved without resorting to brake pressure cut-off as in previous arrangements and for this reason the present invention has the advantage that a faulty signal will not produce unintentional interruption of brake pressure, which if it occurred prior to a brake application being initiated, would preclude attainment of any brake pressure whatsoever.

For example, if a defective circuit in the logic block 1 or 101 of either wheel produces a faulty output signal prior to a brake application being initiated by the operator to inadvertently energize the solenoid of the respective inlet valve 4 or 104 via OR gate 2 or 102 and amplifier 3 or 103, the pulse generator 7 or 107 of the other wheel is activated, as previously explained, to thereby effect intermittent operation of that wheel inlet valve for the duration of the faulty signal. Consequently, this inlet valve is alternately opened and closed so that upon subsequent supply of fluid brake pressure under control of the operator, the wheel brake pressure is able to develop in a controlled manner and thus assure a brake application on at least one of the wheels.

Similarly, if a signal is inadvertently applied to the solenoid operated inlet valve 4 or 104 of one of the wheels, due to a malfunction of amplifier 3 or 103, for example, OR gate 5 or 105 is effective to pass a signal via AND gate 6 or 106 to the pulse generator 7 or 107 of the other wheel to control that wheel inlet valve 4 or 104 so as to operate intermittently and accordingly provide for a controlled development of fluid pressure to the other wheel brake unit when a brake application is initiated.

Having now described the invention what I claim as new and desire to secure by Letters Patent, is:

1. A vehicle antiskid brake control system comprising for each wheel:
   a. a fluid pressure operated brake unit;
   b. an inlet modulator valve having a solenoid operator for operating said modulator valve to establish operator controlled fluid brake pressure communication with said brake unit when deenergized and to cut-off said communication when energized;
   c. wheel sensing means for monitoring the dynamic condition of the wheel to provide at least one wheel behavior signal when the wheel exhibits a skidding tendency;
   d. logic means subject to said at least one wheel behavior signal for evaluating the dynamic condition of the respective wheel and for providing first and second output signals accordingly;
   e. a pulse generator for emitting a pulsed output signal, said first output signal or said pulsed output signal providing a control signal that is connected to said modulator valve solenoid operator to control energization thereof, said pulse generator of each one of a pair of wheels being activated responsive to said control signal being present at the other one of the pair of wheels only when said second output signal at said one of the pair of wheels is absent.

2. An antiskid brake control system as recited in claim 1, further comprising for each wheel:
   a. a first OR gate subject at one input to said control signal and at another input to said second output signal for providing a third output signal; and
   b. an AND gate subject at a signal inverting input to said second output signal and at another input to said third output signal at the other one of said wheels for providing a fourth output signal to activate said pulse generator.

3. An antiskid brake control system as recited in claim 2, further comprising for each wheel:
   a. a second OR gate subject at one input to said first output signal and at another input to said pulsed output of said pulse generator for providing a fifth output signal; and
   b. amplifier means for providing said control signal in response to said fifth output signal at a level sufficient to operate the solenoid of said modulator valve.

* * * * *